(12) United States Patent
Baudart

(10) Patent No.: US 7,357,447 B2
(45) Date of Patent: Apr. 15, 2008

(54) CROSS-MEMBER FOR MOTOR VEHICLE, ASSOCIATED VEHICLE AND MOUNTING METHOD

(75) Inventor: Laurent Baudart, Fresnoy en Thelle (FR)

(73) Assignee: Faurecia Interieur Industrie, Nanterre (FR)

( * ) Notice: Subject to any disclaimer, the term of this patent is extended or adjusted under 35 U.S.C. 154(b) by 242 days.

(21) Appl. No.: 11/059,381

(22) Filed: Feb. 17, 2005

(65) Prior Publication Data
US 2005/0179243 A1    Aug. 18, 2005

(30) Foreign Application Priority Data
Feb. 18, 2004   (FR) .................................. 04 01631

(51) Int. Cl.
*B60J 7/00* (2006.01)
(52) U.S. Cl. ..................... 296/193.02; 296/70; 280/748
(58) Field of Classification Search ................. 296/70, 296/193.02; 280/748
See application file for complete search history.

(56) References Cited

U.S. PATENT DOCUMENTS 6,851,742 B1 * 2/2005 Kubiak ................... 296/193.02

FOREIGN PATENT DOCUMENTS

| DE | 196 01 800 | 8/1996 |
|---|---|---|
| DE | 197 28 557 | 1/1998 |
| EP | 0 479 830 | 4/1992 |
| FR | 2 739 602 | 4/1997 |

* cited by examiner

Primary Examiner—Joseph D. Pape
(74) Attorney, Agent, or Firm—Young & Thompson

(57) ABSTRACT

This cross-member (11) for a vehicle dashboard cross-member, includes a beam (25) and a knee brace (27) for connecting the beam (25) to the floor (17) of the vehicle. The knee brace (27) has a stationary part (41), which is connected with the beam (25) and a part (43) that is movable relative to the stationary part (41) between a retracted position and at least one extended position for connection to the floor (17) of the vehicle. The knee brace (27) includes elements (45) for holding the movable part (43) in its retracted position. The holding elements (45) are joined to the knee brace (27) in order to be carried thereby into the deployed position.

15 Claims, 4 Drawing Sheets

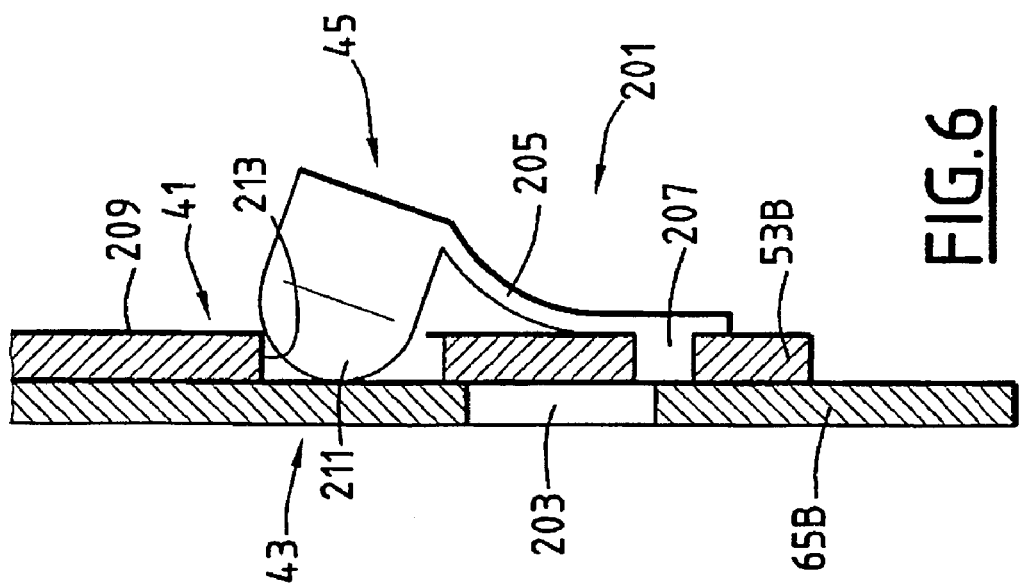
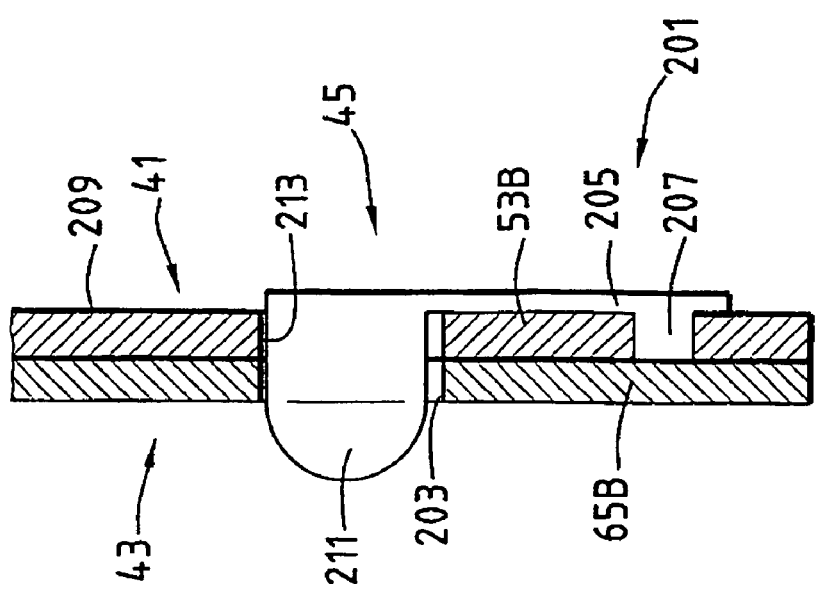

CROSS-MEMBER FOR MOTOR VEHICLE, ASSOCIATED VEHICLE AND MOUNTING METHOD

TECHNICAL FIELD

The present invention relates to a cross-member for a motor vehicle comprising:
a beam
at least one knee brace for connecting the beam to the floor of the vehicle, the knee brace comprising:
a stationary part connected with the beam;
a part that is movable relative to the stationary part between a retracted position and at least one extended position for connection to the floor of the vehicle; and
means for holding the movable part in its retracted position;

The invention relates, in particular, to a vehicle dashboard cross-member.

BACKGROUND TO THE INVENTION

Cross-members of the aforementioned type are intended to be mounted inside the bodywork of a motor vehicle. The lateral ends of the beam are accordingly fixed to what are known as "A" pillars of the bodywork and the lower end of the knee brace is fixed to the floor of the vehicle.

In order to perform this assembly operation, the cross-member is introduced into the bodywork of the vehicle via an opening in the bodywork.

In order to reduce the overall size of the cross-member during its introduction into the bodywork, the movable part of the knee brace is held in its retracted position by a detachable pin, which joins the movable part to the stationary part and forms the holding means.

Once the cross-member has been introduced into the vehicle, the pin is withdrawn and the movable part of the knee brace is displaced toward the floor of the vehicle, then fixed to the floor. The stationary part and the movable part are then fixed to each other using an additional screw.

A structure of this type is not entirely satisfactory, as there is a risk that the retaining pin between the stationary part and the movable part may become dislodged in the vehicle once the cross-member has been mounted on the floor.

An object of the invention is to solve this problem by providing a cross-member of the aforementioned type that limits the risk of one or more components of the holding means becoming lost in the vehicle.

SUMMARY OF THE INVENTION

Accordingly, the invention relates to a cross-member of the aforementioned type, wherein the holding means are joined to the knee brace in order to be carried thereby into the deployed position.

According to particular embodiments, the cross-member may comprise one or more of the following characteristics, taken individually or in any of the technically possible combinations:
the movable part may be displaced manually along the stationary part from its retracted position to its deployed position;
the holding means comprise a locking member on either the stationary part or the movable part, and a locking port provided in the other one of the stationary part and movable part, the locking member being movable between a locking position, in which it is engaged in the locking port, and a release position that is remote from the locking port;
the holding means are means for holding the movable part on the stationary part by means of friction;
the holding means comprise at least one region for producing friction on the stationary part and at least one region for producing friction on the moving part, the friction regions cooperating by means of friction, at least when the moving part is located in its retracted position;
the friction regions also cooperate by means of friction, at least when the moving part occupies an intermediate position between the retracted position and the deployed position;
the stationary part comprises two flanks, each of which has at least one friction region;
the friction regions are integral with the stationary part and the movable part respectively;
the holding means comprise at least one blade protruding from either the stationary part or the movable part, and a slide for receiving the blade, provided on the other one of the stationary part and movable part;
it comprises locking means preventing the displacement of the movable part relative to the stationary part beyond the deployed position; and
the locking means comprise at least one recess provided in a wall of the slide, one end of the blade being received in the recess when the movable part is in the deployed position.

The invention also relates to a motor vehicle comprising a cross-member as defined above.

According to a variation, the vehicle may comprise:
at least two pillars and first means for fixing the beam to the pillars;
at least one floor and second means for fixing the movable part to the floor;

The invention also relates to a method for mounting a cross-member as defined above in the bodywork of a motor vehicle, wherein it comprises the following steps:
retaining the movable part in its retracted position, using the holding means;
introducing and fixing the beam into the bodywork;
sliding the movable part along the stationary part between its retracted position and its deployed position;
fixing the movable part onto the floor of the vehicle; and
joining the stationary part and the movable part.

BRIEF DESCRIPTION OF DRAWINGS

A better understanding of the invention will be facilitated by the following description, which is given solely by way of example and with reference to the accompanying drawings, in which:

FIG. 5 is a view, taken in section along the line V-V in FIG. 4, of a variation of the cross-member of FIG. 4; and FIG. 6 is a view similar to FIG. 5, the movable part being in its deployed position.

DESCRIPTION OF PREFERRED EMBODIMENT

The directions used below are the conventional directions for a motor vehicle. The terms "front", "rear", "left", "right", "upper" and "lower" thus refer to the direction of travel of the motor vehicle and to the position of a driver.

Figure 1:
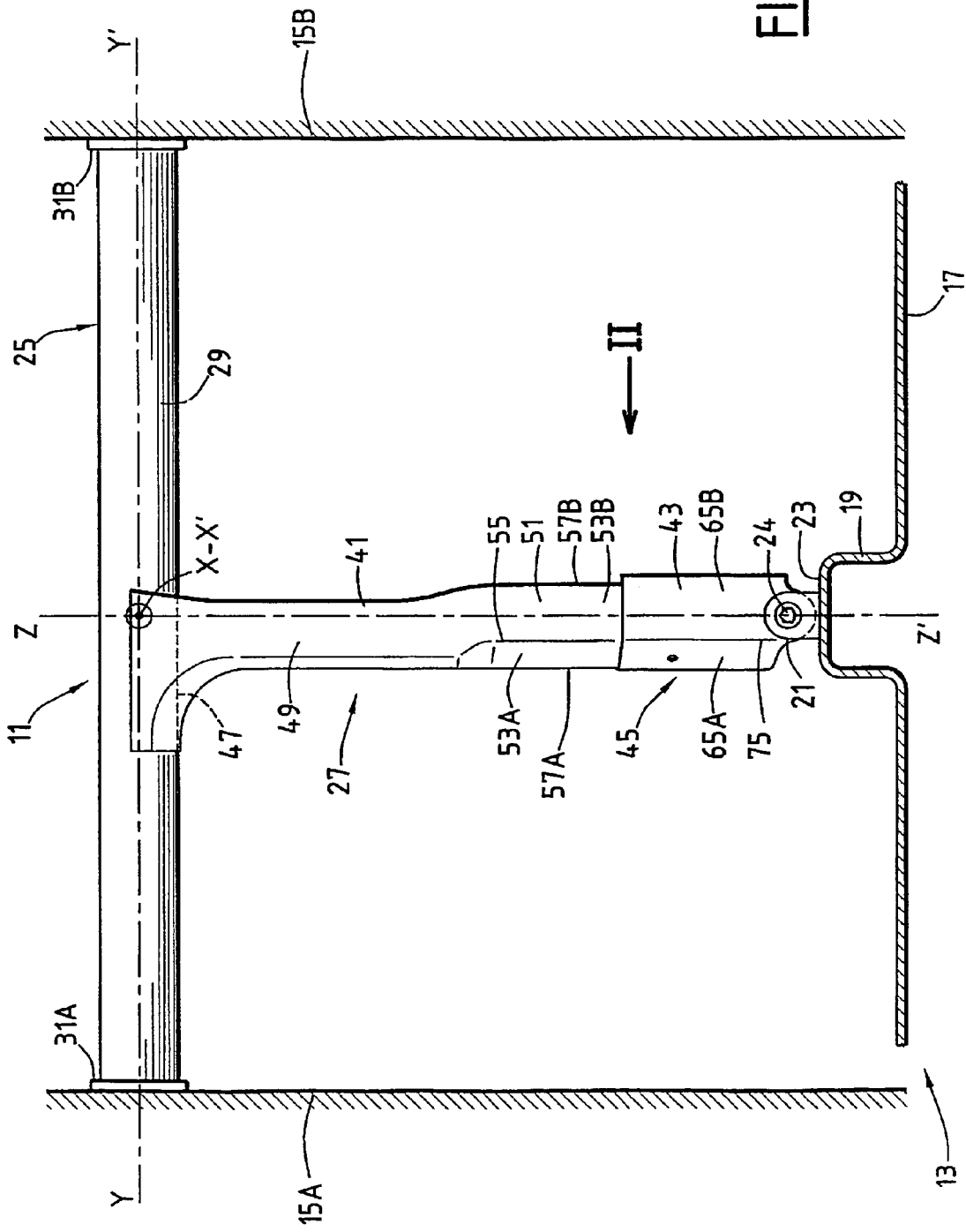
FIG. 1 is a schematic partial sectional view of the bodywork of a vehicle provided with a dashboard cross-member according to the invention, the movable part being in the deployed position.

FIG. 1 illustrates a dashboard cross-member 11 for a motor vehicle, mounted on elements 13 of the bodywork of the vehicle.

These elements 13 comprise two lateral pillars 15A and 15B, known as "A" pillars, to the left and to the right, respectively, in FIG. 1, and a floor 17.

In its middle portion, the floor 17 has a tunnel 19 having an inverted U-shaped cross-section. A fixing member 21 protrudes on the upper surface 23 of the tunnel 19. A threaded passage 24, which is parallel to a longitudinal axis X-X' of the vehicle, is provided in the fixing member 21.

The cross-member 11 comprises a beam 25 and at least one knee brace 27, which protrudes downwardly relative to the beam 25.

The beam 25 comprises a tube 29 and two flanges 31A and 31B for connection to the pillars 15A and 15B of the bodywork 13, arranged respectively at the left and right ends of the beam 25.

As illustrated in FIG. 1, the tube 29 extends along an axis Y-Y' that is substantially transverse and horizontal relative to the longitudinal axis X-X' of the motor vehicle. It has, for example, a substantially circular section over its entire length.

The tube 29 is intended to support members (not shown) for connection to implements of the vehicle, in particular steering column or dashboard supports.

The fixing flanges 31A and 31B extend along a plane perpendicular to the transverse axis Y-Y'. In the example illustrated in FIG. 1, the flanges 31A and 31B rest on the pillars 15A and 15B of the vehicle and are fixed to these pillars 15A and 15B by screws (not shown). The beam 25 is thus connected with the left and right pillars 15A and 15B of the vehicle. Other ways of connecting the lateral ends of the part 25 are conceivable.

The knee brace 27 extends along an axis Z-Z' that is substantially inclined relative to a vertical axis, toward the floor 17 of the vehicle.

It comprises a stationary part 41, a movable part 43 that slides on the stationary part 41, and means 45 for holding the movable part 33 relative to the stationary part 41.

The stationary part 41 is fixed via its upper end 47 to an intermediate part of the beam 25.

The stationary part comprises a substantially planar upper region 49 and a lower region 51 formed by a profile member having a V-shaped cross-section.

The lower region 51 has two flanks 53A and 53B, connected along a lateral edge 55. Each flank 53A, 53B also has a free outer edge 57A, 57B.

Figure 2:
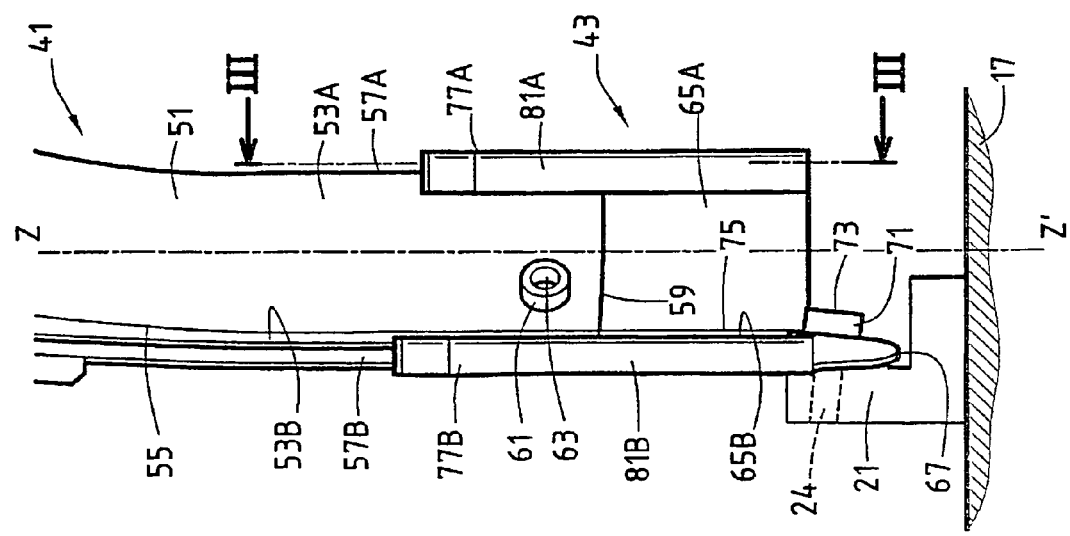
FIG. 2 is a view of a detail of the cross-member of FIG. 1, taken along the arrow II in FIG. 1.

As illustrated in FIG. 2, the stationary part 41 also comprises, in the vicinity of its lower end 59, a first cylindrical boss 61, in which a first tapped hole 63, the axis of which is orthogonal to the axis Z-Z', is provided. This tapped hole 63 receives a screw (not shown) for fixing the stationary part 41 relative to the movable part 43 when the cross-member 11 is mounted in the vehicle. The movable part 43 comprises a profile member having a V-shaped cross-section, the shape of which is substantially complementary to the lower region 51 of the stationary part 41.

The movable part 43 has two lateral cheeks 65A and 65B. Each cheek 65A, 65B rests on a flank 53A, 53B facing the lower region 51 of the stationary part 41.

As illustrated in FIG. 2, the cheek 65B, to the left of this figure, has, in the vicinity of its lower end 67, a second cylindrical boss 71, in which a second tapped hole 73 is provided. This second tapped hole 73 receives a screw (not shown) for fixing the movable part 43 to the member 21 for fixing to the floor 19 of the vehicle when the crossmember 11 is mounted in the vehicle.

The two cheeks 65A, 65B of the movable part 43 are connected along a lateral edge 75. Each edge 65A, 65B of the movable part also comprises a free edge 77A, 77B.

The movable part 43 may be slid along the perpendicular axis Z-Z' relative to the stationary part 41, between a retracted position, in which the movable part 43 is in proximity to the beam 25, and an extended position, in which the movable part 43 is remote from the beam 25.

Figure 3:
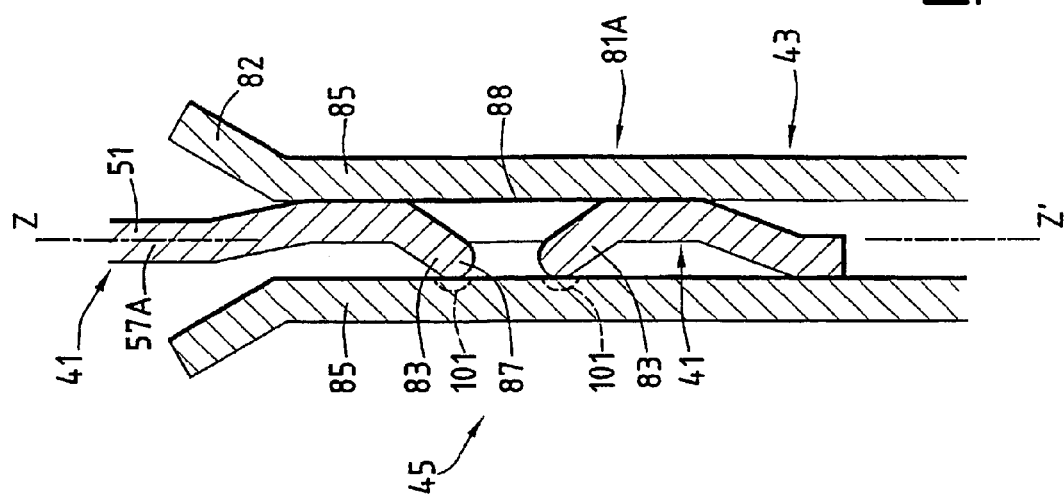
FIG. 3 is a lateral view of a detail of FIG. 2, taken in section along the line III-III of FIG. 2.

As illustrated in FIG. 3, the means 45 for holding the movable part 43 on the stationary part 41 comprise:

on each free edge 77A, 77B of the movable part 43, a slide 81A, 81B and on each free edge 57A, 57B of the stationary part 41, at least one resilient blade 83. In the illustrated example, the holding means 45 comprise two blades 83 on each free edge 57A, 57B.

Only the structure of the slide 81A on the free edge 77A of the movable part 43 will be described. The structure of the slide 81B is similar to that of the slide 81A. Likewise, only the structure of the blades 83 on the free edge 57A of the stationary part 41 will be described, the structure of the blades 83 on the free edge 57B of the stationary part 41 being similar to that of the blades 83 on the free edge 57A.

As illustrated in FIG. 3, the slide 81A is formed by a fold in the free edge 77A parallel to the axis Z-Z'. The fold is directed toward the interior of the profile member forming the movable part 43.

The upper end 82 of the slide 81A has a flared portion, allowing the stationary part 41 to be introduced into the slide 81A.

The slide 81A has a U-shaped cross-section, with two substantially parallel lateral walls 85.

The free edge 57A of the stationary part 41 is engaged in the opposing slide 81A.

The resilient blades 83 are provided on the free edge 57A of the stationary part 41 by stamping. These blades 83 are integral with the stationary part 41. As illustrated in FIG. 3, the blades 83 have an end 87 resting on a wall 85 of the opposing slide 81A.

Moreover, as a result of the resilience of the blades 83, one face 88 of the lower region 51 of the stationary part 41, remote from the blades 83, rests on the other wall 85 of the slide 81A.

The slide 81A and the resilient blades 83 thus respectively comprise regions that cooperate by means of friction.

In the example illustrated in FIG. 3, these regions cooperate by means of friction, whatever the position of the movable part 43 between its retracted position and its deployed position.

In a variation, these regions are able to cooperate only when the movable part 43 is in its retracted position.

The mounting of a cross-member 11 according to the invention in the bodywork 13 of a vehicle will now be described.

Figure 4:
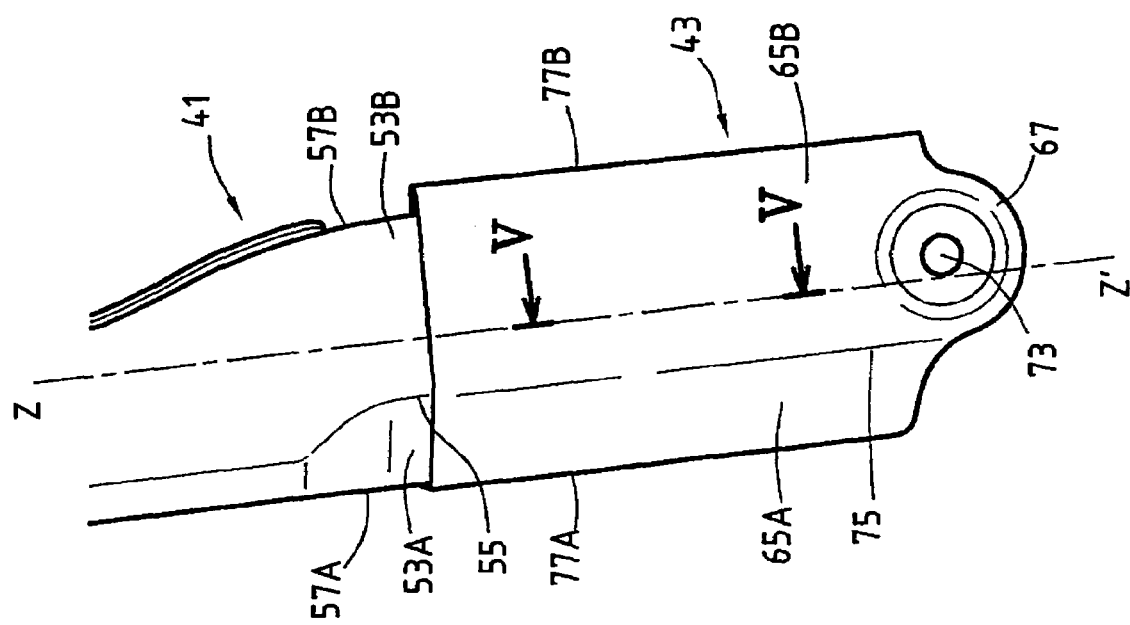
FIG. 4 is a view of a detail of FIG. 1, the movable part being in its retracted position.

In a first stage, the movable part 43 is held in its retracted position, in the vicinity of the beam 25, as illustrated in FIG. 4. The friction between the stationary part 41 and the movable part 43, obtained as a result of the resilient blades 83, retains the movable part 43 in its retracted position. It will be noted that this retention is provided without a single additional component being necessary.

The cross-member 11 thus has a minimal overall size.

In a second stage, an operator or an assembly robot introduces the cross-member 11 into the bodywork via an opening and fixes the lateral flanges 31A, 31B of the beam 25 to the opposing pillars 15A, 15B.

In a third stage, the operator slides the movable part 43 along the stationary part 41, between its retracted position and its deployed position, by overcoming the frictional force between the stationary part 41 and the movable part 43.

During this displacement, the operator may adjust the position of the movable part 43 as a function of the characteristics of the vehicle and, in particular, of the position of the upper surface 23 of the tunnel 19 in the vehicle, without any danger of the movable part 43 becoming detached from the stationary part 41.

In the deployed position, the second tapped hole 73 of the movable part 43 faces the threaded passage 24 on the fixing member 21. The operator then fixes the lower end 67 of the movable part 43 to the tunnel 19 by introducing a screw into the second tapped hole 73 and the threaded passage 24.

In a fourth stage, the operator pierces the movable part 43 facing the first tapped hole 63 of the stationary part 41. He then introduces a screw (not shown) into this tapped hole 63 in order to join the stationary part 41 to the movable part 43.

In a first variation, resilient blades 83 are provided only along a free edge 57A of a single flank 53A of the stationary part 41. The free edge 57B of the other lateral flank 53B of the stationary part 41 then lacks the resilient blade 83. This variation simplifies the method for producing the stationary part 41.

In a second variation, the resilient blades 83 are formed from separate components of the stationary part 41, protruding from this stationary part 41.

In a third variation, illustrated by broken lines in FIG. 3, recesses 101 for receiving the ends 87 of the resilient blades 83 are provided in an upper portion of a wall 85 of the slide 81A, in order to receive the end 87 of the resilient blades 83 when the movable part 43 is in its deployed position. Displacement of the movable part 43 beyond its deployed position is thus prevented.

In a fourth variation, illustrated in FIG. 5 and 6, the holding means 45 comprise a locking member 201 that is connected with the stationary part 41, and a locking port 203, which is provided in the movable part 43 and which receives the locking member 201 when the movable part 43 is in the retracted position.

The locking member 201 comprises an elastically deformable tab 205, a lower end 207 of which is fixed to a rear face 209 of the stationary part 41 remote from the movable part 43. At its free end, it also comprises a locking lug 211 engaged in a passage 213. The passage 213 is provided in a flank 53B of the stationary part 41, in a middle portion of this flank 53B.

When the movable part 43 is in its retracted position, the locking port 203 is arranged facing the passage 213. In this position, the locking lug 211 may be moved, by means of deformation of the tab 205, between a locking position, in which it is engaged in the locking port 203 (FIG. 5), and a release position remote from the locking port 203.

In order to displace the movable part 43 from its retracted position to its deployed position, the operator pushes the locking lug 211 toward the rear face 209 of the movable part 43, from its locking position to its release position, then displaces the movable part 43 to its retracted position, as described above, by sliding along the stationary part 41.

During the displacement of the movable part 43 along the stationary part 41, the locking lug 211 rests on the opposing cheek 65B, as illustrated in FIG. 6.

In a variation, a recess 101 for receiving the locking lug 211 may also be provided in the movable part 43, above the locking port 203.

When the movable part 43 is in its deployed position, the recess 101 is arranged facing the passage 113, and the locking lug 211 is received in the recess 101 in order to hold the movable part 43 in its deployed position.

In a further variation, the locking member 201 may be mounted on the movable part 43, and the locking port 203 may be provided in the stationary part 41.

The above-described invention provides a motor vehicle cross-member 11 that has a small overall size owing to the presence of knee brace 27, which has a retractable movable part 43.

The frictional cooperation between the movable part 43 and the stationary part 41 of the knee brace 27 obviates the need for a holding pin between these two components when the movable part 43 is retracted. The danger of components becoming lost in the vehicle once the cross-member 11 has been mounted is thus avoided.

Moreover, the absence of a pin reduces the number of components to be listed during assembly of the vehicle, and therefore simplifies this assembly.

The invention claimed is:

1. A cross-member for a motor vehicle, the cross member comprising:
    a beam;
    at least one knee brace for connecting the beam to the floor of a vehicle, the knee brace comprising:
        a stationary part connected with the beam;
        a part that is movable relative to the stationary part between a retracted position and at least one extended position for connection to the floor of the vehicle; and
        means for holding the movable part in its retracted position;
    wherein the holding means are joined to the knee brace to be carried thereby into the deployed position and in that the movable part may be displaced from its retracted position to its deployed position by an assembly operator, wherein the knee brace comprises fixing means for fixing the stationary part relative to the movable part in the extended position, said fixing means being separate from said holding means.

2. The cross-member as claimed in claim 1, wherein the movable part may be displaced manually along the stationary part from its retracted position to its deployed position.

3. The cross-member as claimed in claim 1, wherein the holding means comprise a locking member on either the stationary part or the movable part, and a locking port provided in the other one of the stationary part and movable part, the locking member being movable between a locking position, in which it is engaged in the locking port, and a release position that is remote from the locking port.

4. The cross-member as claimed in claim 1, wherein the holding means are means for holding the movable part on the stationary part by means of friction.

5. The crossmember as claimed in claim 4, wherein the holding means comprise at least one region for producing friction on the stationary part and at least one region for producing friction on the moving part, the friction regions cooperating by means of friction, at least when the moving part is located in its retracted position.

6. The cross-member as claimed in claim 5, wherein the friction regions also cooperate by means of friction, at least when the moving part occupies an intermediate position between the retracted position and the deployed position.

7. The cross-member as claimed in claim 5, wherein the stationary part comprises two flanks, each of which has at least one friction region.

8. The cross-member as claimed in claim 6, wherein the stationary part comprises two flanks, each of which has at least one friction region.

9. The crossmember as claimed in claim 5, wherein the friction regions are integral with the stationary part and the movable part respectively.

10. The cross-member as claimed in claim 4, wherein the holding means comprise at least one blade protruding from either the stationary part or the movable part, and a slide for receiving the blade, provided on the other one of the stationary part and movable part.

11. The cross-member as claimed in claim 1, and comprising locking means preventing the displacement of the movable part relative to the stationary part beyond the deployed position.

12. The cross-member as claimed in claim 10 and comprising locking means preventing the displacement of the movable part relative to the stationary part beyond the deployed position, wherein the locking means comprise at least one recess provided in a wall of the slide, one end of the blade being received in the recess when the movable part is in the deployed position.

13. A motor vehicle having a cross-member comprising
a beam;
at least one knee brace for connecting the beam to the floor of a vehicle, the knee brace comprising:
a stationary part connected with the beam;
a part that is movable relative to the stationary part between a retracted position and at least one extended position for connection to the floor of the vehicle; and
means for holding the movable part in its retracted position;
wherein the holding means are joined to the knee brace to be carried, thereby into the deployed position and in that the movable part may be displaced from its retracted position to its deployed position by an assembly operator, wherein the knee brace comprises fixing means for fixing the stationary part relative to the movable part in the extended position, said fixing means being separate from said holding means.

14. The vehicle as claimed in claim 13, and comprising:
at least two pillars and first means for fixing the beam to the pillars;
at least one floor and second means for fixing the movable part to the floor.

15. A method for mounting a cross member in the bodywork of a motor vehicle said cross-member comprising
a beam;
at least one knee brace for connecting the beam to the floor of a vehicle, the knee brace comprising:
a stationary part connected with the beam;
a part that is movable relative to the stationary part between a retracted position and at least one extended position for connection to the floor of the vehicle; and
means for holding the movable part in its retracted position;
wherein the holding means are joined to the knee brace to be carried thereby into the deployed position and in that the movable part may be displaced from its retracted position to its deployed position by an assembly operator, and the method comprising the following steps:
retaining the movable part in its retracted position, using the holding means;
introducing and fixing the beam into the bodywork;
sliding the movable part along the stationary part between its retracted position and its deployed position;
fixing the movable part onto the floor of the vehicle; and
joining the stationary part and the movable part by fixing means separate from said holding means.

* * * * *